May 11, 1943.   L. C. HYATT ET AL   2,318,610
HYDRAULIC SYSTEM FOR MOTOR VEHICLES
Filed Oct. 10, 1940   3 Sheets-Sheet 1
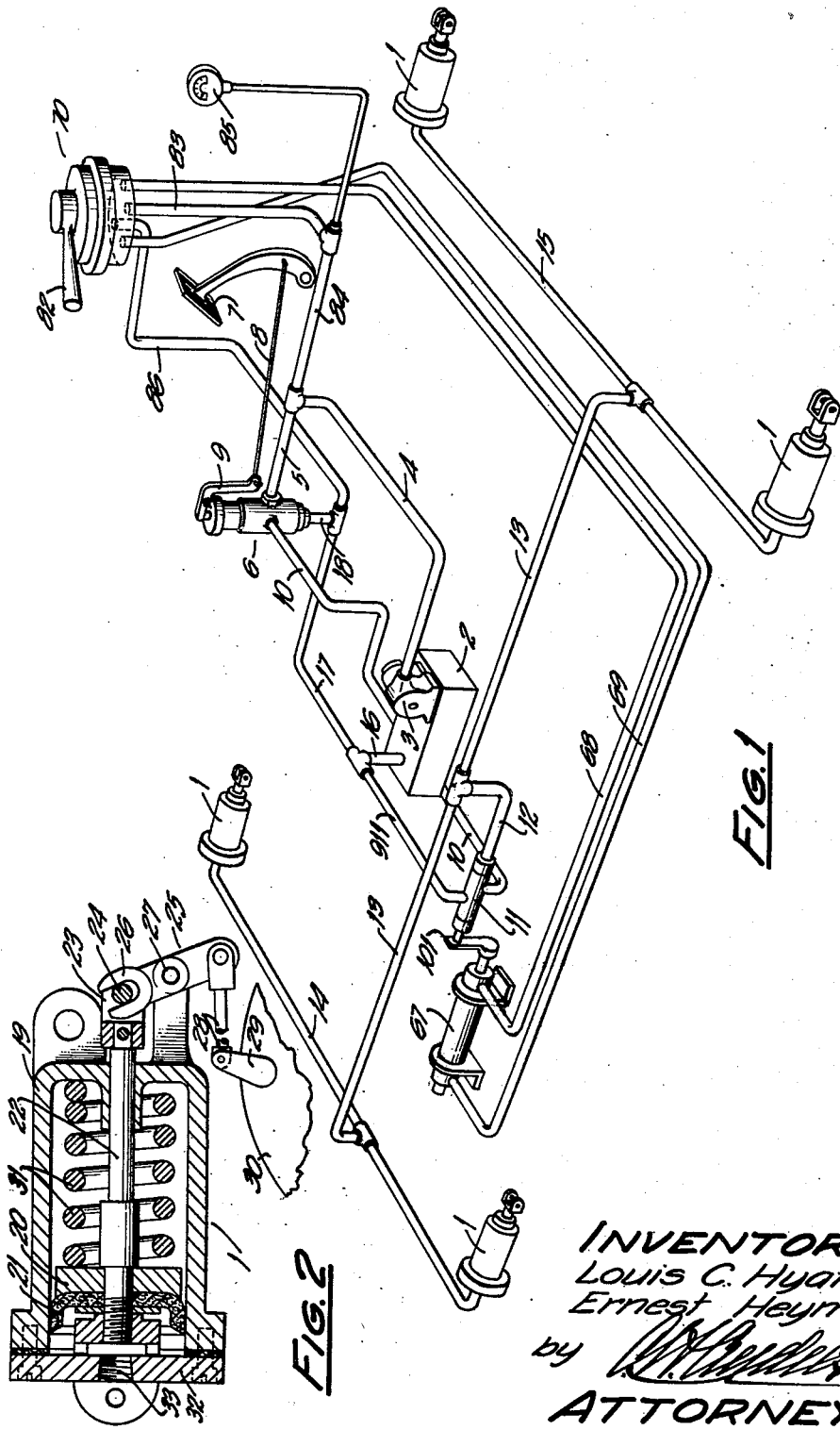
INVENTORS:
Louis C. Hyatt
Ernest Heyman
by
ATTORNEY

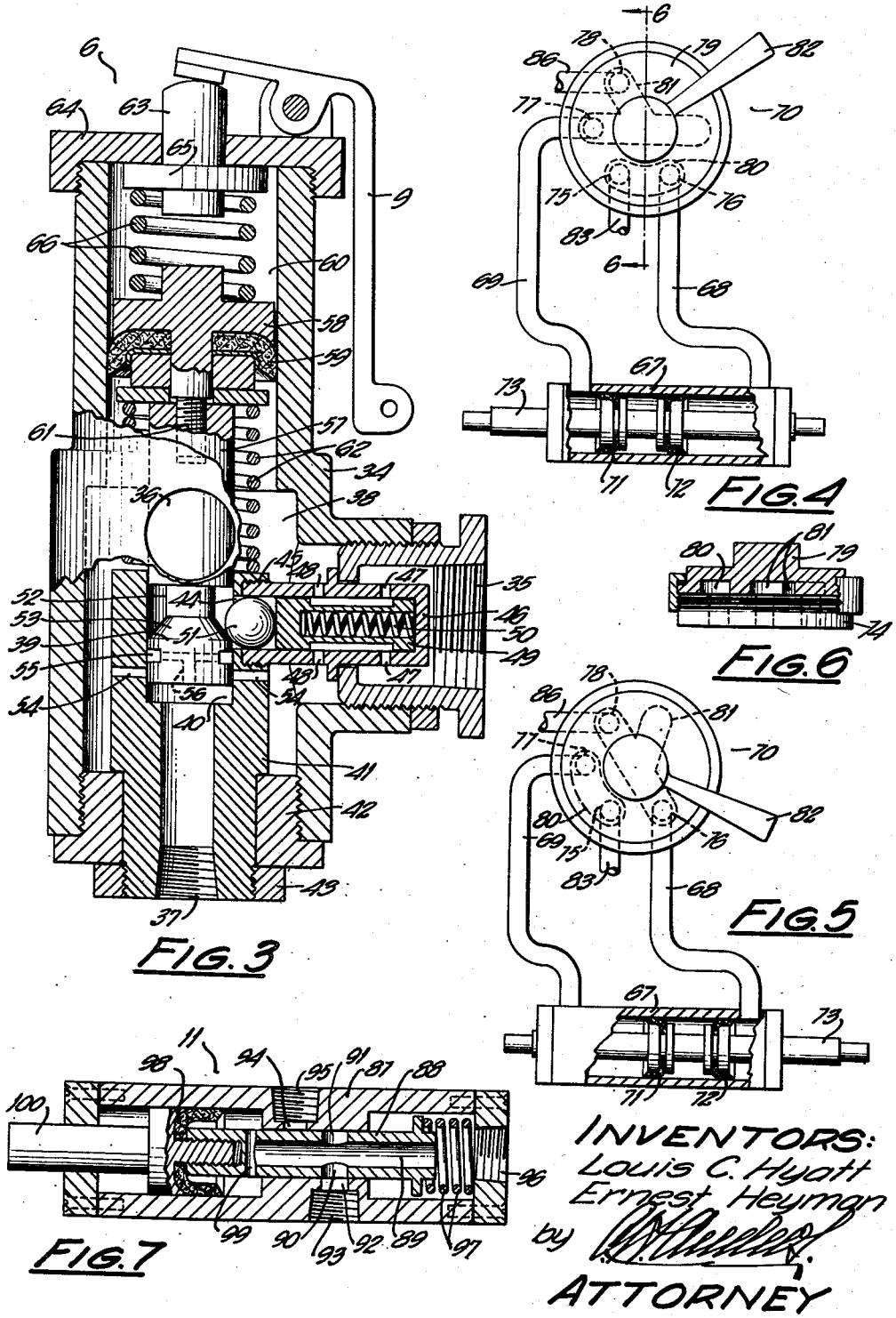

May 11, 1943.     L. C. HYATT ET AL     2,318,610
HYDRAULIC SYSTEM FOR MOTOR VEHICLES
Filed Oct. 10, 1940     3 Sheets-Sheet 3
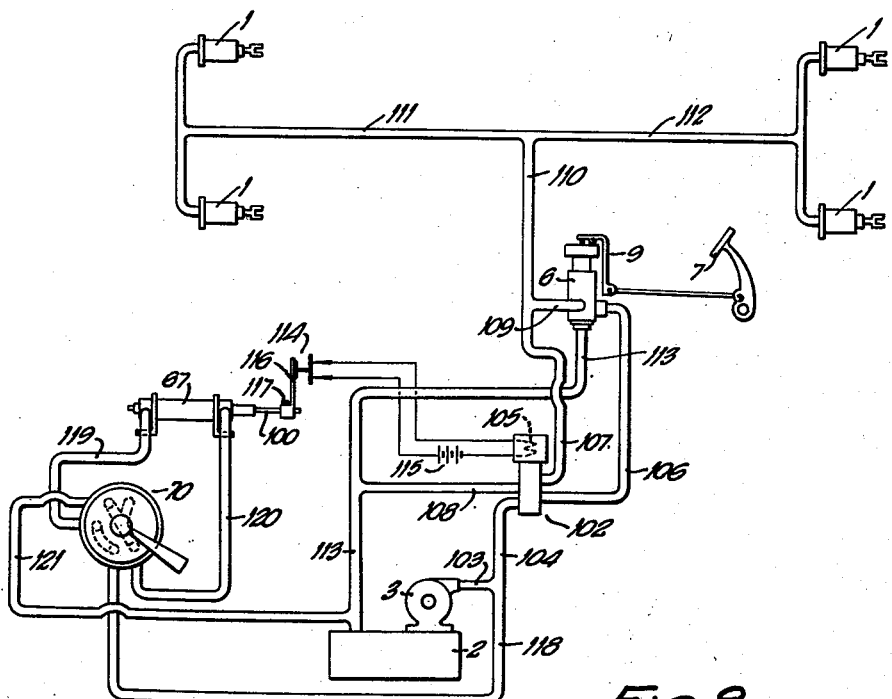
Fig. 8
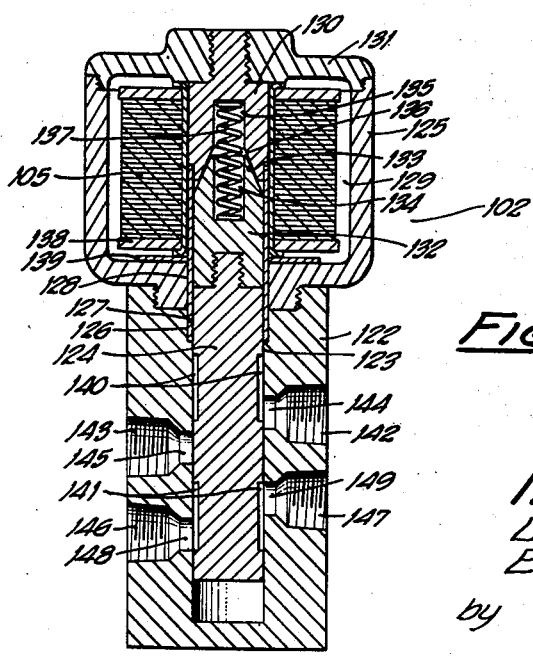
Fig. 9
INVENTORS:
Louis C. Hyatt
Ernest Heyman
by
ATTORNEY Patented May 11, 1943

2,318,610

UNITED STATES PATENT OFFICE 2,318,610

HYDRAULIC SYSTEM FOR MOTOR VEHICLES

Louis C. Hyatt, Albany, and Ernest Heyman, Hampton Manor, N. Y., assignors to Consolidated Car-Heating Company, Inc., Albany, N. Y., a corporation of New York Application October 10, 1940, Serial No. 360,598

12 Claims. (Cl. 303—6.1)

Our invention particularly relates to hydraulic systems for operating the doors and brakes of motor vehicles and to one in which control elements are so connected and correlated that the brakes may be released only when the doors of the vehicle are closed, and are automatically applied when the doors are opened.

In some hydraulic brake systems, the brakes are applied by hydraulic pressure. The fluid pressure employed in applying the brakes in systems of this character may be dependent upon the force applied to the brake pedal or it may be dependent upon the degree to which the brake pedal is depressed.

It is a first object of the present invention to provide a brake system for a motor vehicle in which a positive, preferably mechanical, means is employed for applying the brakes and hydraulically or fluid-operated means is employed only for releasing the brakes. In a system of this character, should there be a failure of hydraulic pressure the brakes will be applied.

Another object lies in providing a brake system of the above character in which fluid pressure is developed and a means is employed for controlling the fluid pressure therein employed in operating the brakes, which means is adapted to be operated by the usual brake pedal of the vehicle.

Another object of our invention resides in providing, in a system of the above character, means for operating the doors and brakes of the motor vehicle and means for preventing a release of the brakes when the doors are in other than closed position; the last mentioned means also functioning automatically to apply the brakes upon the opening of a door.

Another object resides in providing a system of the character last above pointed out in which the means for preventing a release of the brakes when the doors are in other than closed position and for automatically applying the brakes upon an opening of the door is electrically operated.

Still another object resides in providing in a system of the foregoing character a control valve adapted to be operated by the brake pedal for controlling the hydraulic pressure employed in releasing or partially releasing or applying the brakes, which valve is so constructed and arranged that, though the fluid pressure in the system is not produced by the application of force to the brake pedal, the pressure employed in applying the brakes will be proportional to the pressure applied to the pedal and, therefore, an indication or "feeling" of the magnitude of the pressures employed in applying the brakes will be afforded the operator through the brake pedal. Hence, a precise control of the braking pressures may be maintained by the operator of the motor vehicle.

With these and other objects in view, our invention includes the novel system, the elements, and the combinations and arrangements thereof described below and illustrated in the accompanying drawings, in which—

Fig. 1 is a perspective view of our preferred form of door and brake operating system;

Fig. 2 is a sectional view through the brake operating cylinder and associated mechanisms;

Fig. 3 is a fragmentary elevation view, partially in section, of a control valve;

Fig. 4 is a somewhat schematic fragmentary view of the door operating motor and control therefor;

Fig. 5 is a view similar to Fig. 4 but showing the control and door operating motor in an alternative position;

Fig. 6 is a detail view, partially in section taken in about the plane 6—6 of Fig. 4;

Fig. 7 is a sectional view taken longitudinally through the control valve which prevents releasing of the brakes when the doors of the vehicle are open and which automatically applies the brakes upon the opening of a door;

Fig. 8 is a somewhat schematic piping diagram of a modified form of our invention; and Fig. 9 is a sectional elevation view through an electrically operated valve adapted for use in the system of Fig. 8.

In our present system, we prefer to employ oil as the medium for operating the doors of the vehicle and for releasing the brakes. Oil and similar liquids have many advantages over other types of fluids, such as air and the like, heretofore employed in braking systems for motor vehicles since compressor condensation and possible freezing are eliminated and lubrication of the moving parts of the system is always provided.

In the following, we will first describe those portions of our system which directly relate to the control of the brakes of the vehicle.

Referring first to Fig. 1, 1 indicates generally the brake cylinders, the pistons in which function, as hereinafter described, to release the brakes as liquid under pressure is supplied thereto but which otherwise are urged toward their brake-applying positions. Fluid is pumped from a reservoir 2 by means of pump 3, operated by a motor such as the electric motor shown in Fig. 1, through pipes 4 and 5 to the brake valve, indicated generally at 6, which normally serves to control the fluid pressure in the brake cylinders 1. The valve 6 is operatively connected to the brake pedal 7 through the link 8 which is connected to a bell crank 9 pivotally mounted on the casing of valve 6 and adapted to engage the end of a plunger projecting through the top of the valve casing. When the valve 6 is in brake-releasing position, fluid passes therethrough from the pipe 5 to a pipe 10 which is connected between valve 6 and a valve 11, the construction and function of which will be later described. However, assuming that the valve member in valve 11 places the pipe 10 in communication with a pipe 12 connected to said valve, fluid may flow through pipes 10 and 12 to pipe 13 which is connected at opposite ends thereof with pipes 14 and 15 which latter pipes are connected with the brake cylinders 1. Therefore, assuming that the valve member of valve 11 is in a position affording communication between pipes 10 and 12 for purposes of describing the brake control system and that valve 6 is in brake-releasing position, that is, unactuated by the brake pedal 7 and affording communication between pipes 5 and 10, fluid is pumped from the reservoirs 2 through pipes 4, 5, 10, 12, 13, 14 and 15 to the brake cylinders under sufficient pressure to release the brakes of the vehicle.

The return line of the system includes the pipe 16 which communicates with the reservoir 2 and which is connected with pipe 17 which, in turn, is connected through pipe 18 to valve 6. When valve 6 is operated through a depression of the brake pedal 7, it serves to cut off the flow of fluid under pressure to the brake cylinders and connects them with the return line of the system thereby relieving the fluid pressure in said cylinders or exhausting them and permitting the brakes to be applied. In other words, when the brake pedal is depressed, valve 6 is operated to cut off communication between the brake cylinders and the high pressure side of the pump 3 and to place pipe 10 in communication with pipe 18 thereby connecting the brake cylinders with the return line to the reservoir.

In Fig. 2, we have illustrated a preferred form of brake cylinder. The brake cylinder indicated generally at 1 comprises a cylindrical casing 19 in which is slidably disposed a piston 20 comprising a washer 21 of suitable material which forms a close sliding fit within the cylinder. The piston shaft 22 passes through one end of the cylinder 19 and is connected by means of a clevis 23 and pin 24 to a lever arm 25. Pin 24 is disposed between the bifurcated end 26 of lever 25 which is pivotally supported intermediate the length thereof as indicated at 27. The other end of lever 25 is connected to a rod 28 which in turn is connected to the arm 29 of the brake operating mechanism which functions to apply or release the brake within the drum 30. A compression spring 31 is interposed between the piston 20 and the end wall of cylinder 19 and tends to urge piston 20 toward the left as viewed in Fig. 2 or in a direction to apply the brakes, in the embodiment illustrated, through the medium of the lever 25 and connecting rod 28. The cylinder head 32 is provided with a threaded opening 33 which is adapted to receive the end of a pipe, such as pipes 14 and 15, through which fluid under pressure may pass into the cylinder and force piston 20 toward the right, compressing the spring 31 and releasing the brake with which the cylinder is associated. It will be understood that the brake cylinders 1 may all be of the character above described and illustrated in Fig. 2 and, therefore, when fluid under pressure is supplied simultaneously to each of the cylinders, the brakes of the vehicle will be released and, when the cylinders are all simultaneously connected, through the operation of valve 6, with the return line to the fluid reservoir, the brakes of the vehicle will be applied.

In the foregoing, we have generally set forth the arrangement of the brake operating portion of our system and the brake operating cylinders therein and we will now describe the details of valve 6 which controls the fluid pressure in the brake cylinders.

Referring to Fig. 3, the valve indicated generally at 6 comprises a casing including a body 34 which is provided with a fluid inlet 35, a fluid outlet 36 to which pipe 10, leading to the brake cylinders, is adapted to be connected and a fluid outlet 37 to which pipe 18 may be connected. The interior 38 of the valve body lies in communication with the outlet 36 and may be placed in communication with or cut off from the outlet 37 by means of a valve member indicated generally at 39 which is slidably disposed within the cylindrical bore 40 of an insert 41 in the valve body. Insert 41 may be cast integral with the body of the valve or may be fastened therein as, for example, by the threaded sleeve 42 and locknut 43 as illustrated.

The wall of the insert is provided with an opening 44, threaded as indicated at 45, and in which is threaded a hollow valve element 46. The element 46 is arranged to control the flow of fluid from the inlet 35 to the interior 38 of the valve and is provided with inlet ports 47 and exhaust ports 48 and a valve member 49, slidably disposed within the element 46, which is adapted to place the inlet and the exhaust ports in communication with each other or to cut off communication therebetween. A compression spring 50, interposed between the valve member 49 and one end of the valve element 46, serves to urge the element toward the left as viewed in Fig. 3. A ball 51 is disposed between valve member 49 and the valve member 39 and correlates the movement of valve member 49 with the movement of valve 39. Valve member 39 is provided with a restricted portion 52 and a generally tapered or frusto-conical portion 53. When the valve element 39 lies in the position illustrated, ball 51 bears against the frusto-conical portion thereof and holds the valve element 49 in a position providing communication between the inlet ports 47 and exhaust ports 48 of the valve element 46. Therefore, assuming that pipe 5 is connected to the inlet 35, fluid under pressure may flow through the ports 47 and 48 into the interior 38 of the valve and thence through outlet 36 to pipe 10 and the brake cylinders. However, when valve member 39 is depressed or moved downwardly, ball 51 will then be free to move toward the left as viewed in Fig. 3, permitting spring 50 to expand and move valve member 49 toward the left and thereby cutting off communication between the inlet and exhaust ports of valve member 46.

The downward movement of valve member 39 also serves, when moved to a sufficient degree, to place the interior 38 of the valve in communication with the outlet 37 thereof which is connected with the return line to the fluid reservoir. For this purpose, the walls of the insert 41 are provided with ports 54 and the valve member 39 is provided with ports 55 which are adapted to register with the ports 54. The ports 55 are connected with a central passage 56 so that when ports 55 are brought into registry with ports 54 fluid may flow from the interior of the valve therethrough and through the central passage 56 to the outlet 37 of the valve.

From the foregoing, it will be noted that operations of the valve member 39 directly control the discharge of fluid from within the valve body to the outlet 37 and indirectly control the admission of fluid under pressure to the interior of the valve.

The valve member 39 comprises a stem 57 to the upper end of which is connected a piston indicated generally at 58 comprising a washer 59 of suitable material which may be compressed into a closely sliding fit within the cylindrical bore 60 of the upper end of the valve body or casing. The piston 58 is fastened to the stem 57 by means of the screw threaded end 61 thereof which is threaded within the end of stem 57. A compression spring 62 is preferably interposed between the piston and the top of insert 41 to urge the piston and valve member 39 upwardly and means are provided for imparting movement from the brake pedal to the piston to cause it to be moved downwardly when the brake pedal is depressed.

We prefer to provide a means, last above referred to, which is of such character that when the valve 6 is operated to vary the pressure in the brake cylinders the operator depressing the brake pedal may be able to sense the degree of such variation in pressure in the system by the pressure or change in pressure which he applies to the brake pedal. The valve 6 is operable to vary the fluid pressure in the brake cylinders, and is so constructed that the magnitude of the force applied in depressing the brake pedal will be proportional to the magnitude of the force exerted in applying the brakes. Therefore, in order to afford to the operator an indication or measure of the braking force being applied when the foot pedal is depressed, we provide a resilient connection rather than a rigid connection between the piston 58 and the bell crank 9 which is connected to the brake pedal. A plunger 63 is slidably fitted within an opening within cap 64 of the valve casing which closes the upper end of the valve body. Plunger 63 is arranged to be engaged by bell crank 9 and is provided with a shoulder 65 between which and the piston 58 is disposed a helical spring 66.

When the brake pedal is initially depressed, bell crank 9 forces plunger 63 downwardly, compressing the spring 66 and depressing the piston 58 against the pressure offered by the fluid in the valve. As the spring 66 is compressed and piston 58 is depressed, spring 62 will also be compressed and therefore the resistance offered by the brake pedal to depression increases as it is moved further to depress the piston 58.

It will be understood that when the fluid in the brake cylinders is under the normal pressure developed in the system with the pistons therein effecting a release of the brakes, that the pistons may be moved still further to compress the springs within said cylinders. Hence, when the piston 58 in valve 6 is depressed, fluid may be displaced therefrom to the brake cylinders.

When a reduction in pressure in the system occurs due to a depression of the brake pedal and a resulting depression of the piston 58, expansion of spring 66 may occur until the spring pressure on the one side of piston 58 and the spring and fluid pressure on the other side thereof are equalized. This action, of course, may occur while the brake pedal is being depressed or held substantially stationary. Hence, the pressure applied to the foot pedal is proportional to the pressure supplied in the brake cylinders to apply the brakes.

It will be seen from the foregoing, therefore, that the valve 6 controls the fluid pressure in the brake cylinders 1 by controlling the flow of fluid under pressure thereto and the exhaust of fluid therefrom and, furthermore, that the fluid under pressure is utilized only to release the brakes. Moreover, as above indicated, the control valve 6 is of such character that it affords to the operator of the vehicle an indication as to the measure of pressure being employed in applying the brakes when the brake pedal is depressed.

In the foregoing, we have described those portions of our system which relate to the control of the vehicle brakes and have assumed for descriptive purposes that the valve 11 is at all times affording communication between pipes 10 and 12 in the system. This valve, however, is designed and so arranged as to prevent a release of the brakes when the doors of the vehicle are in other than closed position and, therefore, valve 11 is operable to supersede the control valve 6 under conditions which will become apparent in the following description directed to the portions of our system employed for door operating purposes.

Referring again to Fig. 1, a door operating cylinder or motor is indicated generally at 67 in which is slidably fitted a piston and piston rod which are adapted to be reciprocated by the admission of fluid under pressure to either side of the piston. For this purpose, pipe 68 is connected in communication with one end of the cylinder 67 and a pipe 69 is connected in communication with the cylinder adjacent its other end and the other ends of these pipes are connected with a door-operating control valve indicated generally at 70. Briefly, the control valve 70 is operable to supply fluid under pressure through one of said pipes 68 and 69 to one side of the piston in cylinder 67 while connecting the other of said pipes to the exhaust or return line to reservoir 2 thereby causing the piston in cylinder 67 to move in one direction. When control 70 is actuated to reverse the connections to cylinder 67, the piston will be caused to move in the opposite direction.

Although the mechanism which is operated by the piston in cylinder 67 for opening and closing the door of the vehicle is not illustrated, it will be understood that the cylinder 67 and associated mechanism are so arranged that movement of the piston in said cylinder toward the right as viewed in the drawings effects a closing of the vehicle door and that a movement thereof toward the left opens the door. The cylinder or motor 67 and associated control valve 70 are best shown in detail in Figs. 4 and 5. Within the cylinder 67 is slidably disposed a piston or, as in the embodiment illustrated, a pair of pistons 71 and 72 which are secured to the shaft 73 which is adapted to actuate the door-operating mechanism.

For descriptive purposes, the control valve 70 for the motor 67 is illustrated as comprising a lower plate 74 in the upper surface of which is provided a plurality of ports indicated at 75, 76, 77 and 78. A valve element 79 is rotatably mounted adjacent the upper surface of plate 74 and is provided with a generally arcuate slot 80 and a generally Y-shaped slot 81. The ports in the lower plate element 74 and the slots in the valve element 79 are so arranged that the arcuate slot may be moved to place the port 75 in communication either with the port 76 or port 77 while the Y-shaped slot will place the port 78 either in communication with the port 77 or the port 76. Valve element 76 is provided with a suitable handle 82.

In the embodiment illustrated, port 75 is connected through pipe 83 to pipe 84 (see Fig. 1) which, in turn, is connected with pipes 4 and 5 or with the pressure side of the fluid circulating system. As shown in Fig. 1, a pressure gauge 85 may be connected into the system at the T connection between pipes 83 and 84 to provide the operator with an indication of the pressure conditions within the system. The pipe 83 which conducts fluid to the port 75 in the control valve may be considered the inlet pipe from which fluid may be supplied under pressure to either side of the pistons in the cylinder or fluid-operated motor 67. In Fig. 4, the arcuate slot 80 affords communication between the ports 75 and 76 and, therefore, fluid under pressure may flow through pipe 68 to cylinder 67 on the right side of the piston 72 therein. At that same time, the Y-shaped slot 81 places ports 77 and 78 in communication with each other. Port 78 is connected through pipe 86 (see Fig. 1) with the return pipe line of the fluid circulating system and, as illustrated, may be connected at the T connection between the pipes 17 and 18. In other words, port 78 communicates with the exhaust line and, when placed in communication with port 77 as illustrated in Fig. 4, fluid may flow from cylinder 67 through the pipe 69 and ports 77 and 78 to the reservoir 2 thereby exhausting the space within the cylinder 68 to the left of the piston 71. Hence, with the control 70 positioned as illustrated in Fig. 4, pistons 71 and 72 and shaft 23 will be moved toward the left thereby opening, as hereinabove assumed, the door of the vehicle.

When the handle 82 of the control valve 70 is moved to the position illustrated in Fig. 5, the connections to the cylinder 67 are reversed to those above described and the pistons and shaft 73 will be moved toward the right to effect a door closing operation. In other words, for the position of the valve element of the control in Fig. 5, the fluid inlet pipe is placed in communication with pipe 69, and the pipe 68 through ports 76 and the Y-shaped slot 81 is placed in communication with the exhaust port 78 and pipe 86.

It is desirable so to arrange and correlate the brake-operating mechanism and door-operating mechanism of a motor vehicle that the brakes cannot be released when the door is in other than closed position. In our system wherein a preferably mechanical means or spring is employed for applying the brakes and fluid pressure is used for releasing the brakes, the valve 11, heretofore referred to, in the circulating system is employed to attain this desired result. Valve 11 is shown in detail in Fig. 7 and its location in the system is clearly shown in Fig. 1. Valve 11 comprises a casing 87 within which is slidably disposed a valve element 88. The element 88 has a central bore 89 and lateral ports 90 and 91. The port 90 is adapted to register with a port 92 in the valve casing which includes a threaded opening 93 in which one end of the pipe 10 is adapted to be secured. Port 91 is adapted to register with a port 94 which includes a threaded opening 95 in which one end of a pipe 911 is adapted to be secured and which is connected at its other end with the T connection between the pipe 17 and pipe 16 which communicates directly with the reservoir 2. At one end thereof the casing 87 is provided with a threaded opening 96 in which one end of pipe 12 is adapted to be secured.

It will be remembered that pipe 10 communicates with valve 6 and that when pedal 7 is not depressed, fluid under pressure may flow from the reservoir through pipes 4 and 5 to pipe 10 and, therefore, to the port or inlet port 92 of valve 11. With the valve element in the position illustrated, fluid under pressure may flow through registering ports 90 and 92, the bore 89 of the valve element and through pipe 12, secured in opening 96 of the valve casing, to the brake cylinders. The port 94 of valve 11, however, lies in communication with the return line of the fluid circulating system, that is, it is connected through pipes 911 and 16 directly with the fluid reservoir. Therefore, if valve element 88 is moved to a sufficient extent toward the left as viewed in Fig. 7, port 90 will be moved out of registry with port 92, thereby cutting off the supply of fluid under pressure to the brake cylinders, and the port 91 will be moved into registry with port 94 thereby connecting the brake cylinders with the return line of the system. In other words, when port 91 is brought into registry or partial registry with port 94, pressure in the brake cylinders will be relieved due to the fact that the cylinders will be connected through pipe 12, which is secured in opening 96 of valve 11, the bore of valve element 88, ports 91 and 94 and pipes 911 and 16 to the reservoir 2.

The valve element 88 is preferably provided adjacent one end thereof with a shoulder 96 between which and the end of the casing of the valve is interposed a helical spring 97 which tends to urge the valve element toward the left as viewed in Fig. 7. The valve member 88 is also preferably connected to a piston 98 adjacent its other end, which piston is slidably fitted within a cylindrical bore in the valve casing. The valve element is provided with a transverse passage 99 which communicates with the axial bore thereof and the cylindrical bore in the casing. Hence, in addition to the effect of spring 97, fluid pressure will act upon piston 98 and urge the piston and valve member toward the left.

An operating stem 100 extends through the end of the casing of valve 11 and is adapted to be engaged by a finger 101 which may be secured to the shaft of the door-operating cylinder or motor 67, as shown, for example in Fig. 1. It will be noted from an inspection of the figures and particularly Fig. 1 that when the pistons and shaft 73 of the door-operating motor 67 are moved toward the right, the finger 101, secured thereto, will abut the end of the operating stem 100 of valve 11 and move the valve member 88 toward the right and to the position illustrated in Fig. 7. In this position of the door-operating motor, the door will be substantially closed and valve 11 will permit the flow of fluid under pressure to the brake cylinders thereby permitting a release of the brakes to occur when pressure on the brake pedal 7 is relieved to a sufficient extent. However, assuming that the brakes have been applied and the control valve 70 has been operated to effect an opening of the doors, shaft 73 of the door motor 67 will be moved toward the left as viewed in the figures and the valve element 88 of valve 11 will be free to move under the expansion of spring 97 and the pressure of fluid against the piston 98. Therefore, valve member 88 will move to cut off the flow of fluid through the port 92 to the interior thereof and it will place the interior of valve 11 in communication with the pipe 911 in the return line of the system. Hence, bearing in mind that the brake cylinders lie in communication with the interior of valve 11 through the pipe 12 which is connected therewith, for this position of the valve element, the brake cylinders will be connected directly with the reservoir 2 through the return pipe line of the system and, under these circumstances, should the pressure on brake pedal 7 be entirely relieved, the brakes will not be released since fluid under pressure cannot flow through valve 11 to the brake cylinders.

Furthermore, it will be noted that valve 11 operates to apply the brakes in the event the doors of the vehicle are opened and application of the brakes has not otherwise been effected through an operation of the brake pedal. Assuming that the brakes are released due to the presence of fluid under pressure in the brake cylinders and that the doors are opened, a movement of the valve member 88 of valve 11 will occur toward the left as viewed in Fig. 7, resulting from the door-opening movement of the piston shaft of motor 67. When the valve member has moved to the left a sufficient extent to cut off the flow of fluid under pressure to the brake cylinders, it will also operate to relieve the fluid pressure in the brake cylinders because port 91 of the valve member will lie in registry with port 94 and thereby place the brake cylinders in communication with the return line of the system and the reservoir.

Therefore, it will be seen that the valve 11 does not operate merely to prevent flow of fluid to the brake cylinders. In the event that there is fluid under sufficiently high pressure in said cylinders to release the brakes, it will not then operate, if the door were opened, to close off that portion of the system including the brake cylinders and thereby prevent application of the brakes but, on the other hand, it will relieve the fluid pressure in the brake cylinders by connecting them with the return line of the system and with the reservoir whereby to effect an application of the brakes.

In Fig. 8, we have illustrated a modified system for operating the doors and brakes of a motor vehicle in which an electrically operated means is provided for preventing a release of the brakes when the doors are in other than substantially closed position and which means also functions automatically to apply the brakes upon an opening of a door. One embodiment of this electrically operated means is shown in detail in Fig. 9.

Referring first to Fig. 8, it will be seen that our modified system is generally similar to the system hereinbefore described and comprises the brake cylinders 1, the brake control valve 6 to which is operatively connected the brake pedal 7, and the liquid reservoir 2, pump 3 and control valve 70 for controlling the admission of liquid to and exhaust of liquid from the door-operating motor 67. In this embodiment of our invention, we provide an electrically operated valve, indicated generally at 102, which is also adapted to control the flow of liquid to the brake cylinders 1 and the exhaust of liquid therefrom.

Ordinarily, liquid is delivered under pressure from the reservoir 2 through pipes 103 and 104 to the valve 102. The valve 102 is so arranged that when the coil 105 thereof is energized liquid may pass from the pipe 104 through said valve and to the pipe 106. To the valve 102 are also connected the pipes 107 and 108 and, when the coil 105 of the valve 102 is deenergized, said valve operates to provide communication between these latter two pipes.

Pipe 106 is connected to the inlet 35 of valve 6 and pipe 109 is connected to the fluid outlet 36 of valve 6 and through pipes 110, and 111 and 112 to the brake cylinders 1. Pipe 113 is connected with the fluid outlet 37 of valve 6 and conducts fluid to the reservoir 2.

From the foregoing partial description of our modified system, it will be seen that when the coil of valve 102 is energized the flow of fluid from the reservoir 2 to the brake cylinders and the exhaust of fluid from the brake cylinders to the reservoir may be controlled by an actuation of the brake pedal substantially in the same manner as described in connection with the system of Fig. 1.

However, the pipe 107 is connected with pipe 110 and the brake cylinders and the pipe 108 is connected with pipe 113 which connects with the reservoir. Hence, when the coil of valve 102 is de-energized and pipes 107 and 108 are placed in communication with each other through said valve, as above indicated, fluid will be exhausted from the brake cylinders to the reservoir. Therefore, when the coil of valve 102 is de-energized, the brakes will be applied or, if applied when de-energization thereof occurs, they cannot be released.

An electric control means, indicated generally at 114 as a switch is connected in circuit with the coil 105 of valve 102 and with a source of electrical energy such as the battery indicated at 115. The switch 114 is so arranged that when the doors of the vehicle are closed the coil 105 of valve 102 will be connected across the battery 115 and energized and upon an opening of the doors or a door of the vehicle the circuit to coil 105 will be opened.

In the embodiment illustrated, the actuating element 116 for said switch is illustrated as mounted upon the stem or shaft 100 of the door-operating motor 67. The switch-actuating element may be fastened to shaft 100 by a set screw 117 and includes an arm which is adapted to engage the switch and effect a closure thereof when shaft 100 is moved toward the right as viewed in Fig. 8. It will be understood that when motor 67 operates to move the shaft 100 thereof toward the right as above indicated it operates to close the door of the vehicle and the arm of switch-actuating element 116 is so adjusted relative to shaft 100 and switch 114 that when the door is closed a closure of the switch is effected. It will also be understood that when element 116 is moved away from the switch, the switch will automatically open the circuit to the coil 105.

The motor 67 and control 70 therefor are connected together and with the balance of the system substantially in the same manner as hereinbefore described in connection with Fig. 1. In brief, fluid under pressure is passed through pipe 118 which is connected with pipe 103 to the control valve 70 from which it may pass, depending upon the position to which the control valve 70 is actuated, through pipe 119 or pipe 120 to one or the other side of the pistons in the motor 67. Likewise, fluid may be exhausted from the motor through either of these pipes and through control 70 and pipe 121 which is connected with the reservoir 2. Operation, therefore, of the motor 67 to open or close the doors of the vehicle is effected as hereinbefore described in connection with Fig. 1.

It will be understood that the door-operating motor 67 in both of the embodiments of the systems of our invention may be operatively associated with one or more doors of the vehicle. Furthermore, it will be understood that the shaft of motor 67 is operatively connected with a door of the vehicle in a manner well known in the art and, in the embodiments of our invention herein illustrated, said shaft or the switch 114 or valve 11, is so connected or associated with the vehicle door or doors as to effect an application of the brakes upon an opening of said door or doors. A plurality of switches may be employed and associated respectively with the various doors of the vehicle or with door-operating motors.

In Fig. 9, we have shown one form of electrically operated valve which is adapted for use in the system shown in Fig. 8. The valve, indicated generally at 102 comprises a casing 122 having an axially extending bore 123 in which is slidably disposed a piston 124.

In the embodiment illustrated, a second casing 125 is secured to casing 122 as by means of the screw threaded boss which is adapted to be threaded into a threaded recess in casing 122 surrounding the bore 123 thereof. The bore of casing 122 is slightly enlarged as indicated at 126, at the upper end thereof to receive a sleeve 127 of non-magnetic material which is disposed withing an opening 128 in the casing 125 aligned with the enlarged end 126 of bore 123. The sleeve 127 preferably extends for a distance within the chamber 129 formed in casing 125 and preferably the end thereof engages a peripheral recess on the outer surface of a plug 130 which may be secured as by screw threads to a cap 131 for the top of casing 125. Cap 131 may likewise be attached to casing 125 by means of screw threads as shown.

When the piston 124 is formed of brass or other non-magnetic material, an extension therefor of magnetic material is provided as in the embodiment illustrated. The extension 132 is provided with a threaded recess to receive a threaded boss on piston 124 whereby they may be firmly fastened together. The upper exterior of this extension is generally tapered or frusto-conical as indicated at 133 and recessed at 134. Likewise, plug 130 is recessed at 135 and the lower end flared outwardly as at 136 to permit the tapered end of extension 132 to move upwardly therewithin. A helical spring 137 is disposed within the recesses 134 and 135 and adapted to depress piston 124 to its lowermost position.

A coil comprising a plurality of turns of electrical conductors is disposed within the chamber 129 of valve 102 and is adapted, when energized, to actuate the piston of the valve and move it to the position illustrated in Fig. 9. In the embodiment illustrated, the coil indicated at 105 is mounted on a spool 138 of suitable material, the spool having a bore adapting it to be slid over the insert 127 and adapting it to receive the plug 130 within its upper end. The ends of the spool, for example, may be formed of Bakelite molded with canvas and a compressible washer 139 may be interposed between the lower end of the spool and casing 125, the upper end of the spool being engaged by cap 131 whereby to hold the spool securely in place.

When the coil 105 is de-energized, spring 137 serves to depress the piston 124 and when the coil is energized the piston will be raised substantially to the position illustrated, compressing spring 137.

The piston 124 is provided with a first peripherally extending recess 140 and a second peripherally extending recess 141 which are spaced apart axially of said piston. The casing 122 is provided with threaded openings 142 and 143 communicating respectively through ports 144 and 145, with the bore 123. When the piston 124 is in its lowered position, coil 105 being de-energized, the recess 140 therein will lie in communication with both ports 144 and 145. Pipe 107, as illustrated in Fig. 8, is adapted to be threaded in opening 142 and pipe 108 is adapted to be threaded in opening 143. Therefore, with the piston in the position, above pointed out, liquid may flow from the brake cylinders back to the reservoir 2 and the brakes will be applied.

The casing 122 is also provided with threaded openings 146 and 147 which communicate, respectively, through ports 148 and 149 with the bore 123. The recess 141 is adapted to register with both of these ports when it is moved or elevated by the coil 105 to the position illustrated. Pipe 104 is adapted to be threaded in opening 146 and pipe 106 is adapted to be threaded in opening 147. Hence, when the coil 105 is energized, communication between ports 144 and 145 is cut off and communication between ports 148 and 149 is established whereby liquid under pressure may flow from the pump 3 to valve 6.

The operation of the valve when connected as above indicated and illustrated in Fig. 8 is as follows. When the coil 105 is energized, the piston 124 will assume the position illustrated in Fig. 9, providing communication between ports 148 and 149 through recess 141 and, therefore, liquid under pressure may flow from pipe 104 to pipe 106. Under these conditions, liquid under pressure will flow from pump 3 to valve 6 and the application and release of the brakes of the vehicle may be effected through an operation of the brake pedal. However, when coil 105 is de-energized, spring 137 will depress piston 124 until it abuts the casing at the lower end of the bore 123. In this position of the piston, communication is cut off between ports 148 and 149, and ports 144 and 145 are placed in communication with each other through the peripheral recess 140 in piston 124. Hence, in this latter described position of piston 124, fluid under pressure cannot be admitted to the brake cylinders but, on the other hand, fluid will be exhausted therefrom since pipe 107, which is connected with the brake cylinders, will communicate through port 144, recess 140 of piston 124 and port 145 with pipe 108 which connects with the liquid reservoir 2.

Briefly, the operation of the system when including an electrically operated valve of the character, for example, of that illustrated in Fig. 9 is as follows. When the door or doors associated with the door operating motor 67 is closed, coil 105 of valve 102 will be energized through the closing of switch 114 thereby permitting application and release of the brakes by means of the brake pedal. However, when the control valve 70 for the door-operating motor 67 is operated to open the door or doors of the vehicle or in the event the door or doors should be opened in some other manner, the circuit to coil 105 of valve 102 is broken through the opening of switch 114 thereby de-energizing coil 105. When this occurs, valve 102 operates to exhaust the liquid from the brake-operating cylinders and to prevent a supply of liquid under pressure thereto. De-energization of coil 105, therefore, effects an application of the brakes and prevents a release thereof. When the doors are again closed, however, the brakes of the vehicle may be controlled in the normal way by means of the brake pedal.

It is to be observed that in our present system wherein oil or some other suitable liquid is employed that such liquid is substantially the only fluid or medium which is used in the system to perform work in the normal operation thereof. In other words, the system is designed properly to function with the use only of a liquid therein thereby obviating the necessity of employing any additional or other media having the disadvantages, hereinbefore set forth, which are inherently incident to their use.

While we have described our invention in its preferred embodiments, it is to be understood that the words which we have used are words of description rather than of limitation. Hence, changes within the purview of the appended claims may be made without departing from the true scope and spirit of our invention in its broader aspects.

What we claim is:

1. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a pipe system having a liquid therein and being operatively connected with said pressure-operated means, said liquid being substantially the sole work-performing medium in said system, pump means in said system adapted to develop and maintain a liquid pressure in said system, means for operating said pump means while the vehicle is stationary, means for controlling the liquid pressure in said pressure-operated means, and means for reducing the liquid pressure in said pressure-operated means when the door of said vehicle has been opened whereby to prevent a release of the brakes if otherwise applied.

2. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a pipe system having a liquid therein and being operatively connected with said pressure-operated means, said liquid being substantially the sole work-performing medium in said system, pump means in said system adapted to develop and maintain a liquid pressure in said system, means for operating said pump means while the vehicle is stationary, means for controlling the liquid pressure in said pressure-operated means, fluid-operated means for operating the door of the vehicle, manually operable means for controlling the operation of said door-operating means and means for reducing the liquid pressure in said pressure-operated means when said door-operating means has operated to open the door of the vehicle whereby to prevent a release of the brakes if otherwise applied.

3. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a pipe system having a liquid therein and being operatively connected with said pressure-operated means, said liquid being substantially the sole work-performing medium in said system, pump means in said system adapted to develop and maintain a liquid pressure in said system, means for operating said pump means while the vehicle is stationary, manually operable means for controlling the liquid pressure in said pressure-operated means, a fluid-operated motor for operating the door of the vehicle, manually operable means for controlling the flow of fluid to said motor and means for reducing the liquid pressure in said pressure-operated means when said motor has operated to open the door of the vehicle whereby to prevent a release of the brakes if otherwise applied.

4. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a pipe system having a liquid therein and being operatively connected with said pressure-operated means, said liquid being substantially the sole work-performing medium in said system, pump means in said system adapted to develop and maintain a liquid pressure in said system, means for operating said pump means while the vehicle is stationary, manually operable means for controlling the liquid pressure in said pressure-operated means, a liquid-operated motor operatively connected in said system for operating the door of the vehicle, manually operable means for controlling the flow of liquid to said motor and means for reducing the liquid pressure in said pressure-operated means when said motor has operated to open the door of the vehicle whereby to prevent a release of the brakes if otherwise applied.

5. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a liquid circulating system having a liquid therein and being operatively connected with said pressure-operated means, said liquid being substantially the sole work-performing medium in said system and said system including pump means adapted to develop and maintain a liquid pressure in said system, means for operating said pump means while the vehicle is stationary, a liquid-operated motor operatively connected in said system for operating the door of the vehicle, a first valve in said system for controlling the liquid pressure in said pressure-operated means, a second valve in said system for controlling the operation of said motor and a third valve in said system; said third valve being so constructed, correlated and arranged in said system as to reduce the liquid pressure in said pressure-operated means when said motor has operated to open the door of the vehicle whereby to prevent a brake-releasing operation of said brake mechanism.

6. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a liquid-circulating system having a liquid therein and being operatively connected with said pressure-operated means, said liquid being substantially the sole work-performing medium in said system and said system including pump means adapted to develop and maintain a liquid pressure in said system, means for operating said pump means while the vehicle is stationary, a liquid-operated motor operatively connected in said system for operating the door of the vehicle, a first valve in said system for controlling the liquid pressure in said pressure-operated means, a second valve in said system for controlling the operation of said motor, a third valve in said system for controlling the liquid pressure in said pressure-operated means, and means associated with said motor for operating said third valve to reduce the liquid pressure in said pressure-operated means when said motor has operated to open the vehicle door whereby to prevent a release of the vehicle brakes when the door of the vehicle is open.

7. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a liquid-operated motor for operating the door of the vehicle, a liquid-circulating system having a liquid therein and including a liquid reservoir, said liquid being substantially the sole work-performing medium in said system, pump means adapted to develop and maintain a liquid pressure in said system, means for operating said pump means while the vehicle is stationary, and a return pipe line to said reservoir, said pressure-operated means and said motor being operatively connected with said system, a manually operable valve in said system for controlling the flow of liquid under pressure to said pressure-operated means and for connecting said pressure-operated means with the return line to said reservoir, a second manually operable valve in said system for controlling the flow of liquid to said motor and means in said system for connecting said pressure-operated means with the return line to said reservoir when said motor has operated to open the door of the vehicle.

8. In a hydraulic, control system for a vehicle comprising a door, a brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a pipe system having a liquid therein and being operatively connected with said pressure-operated means, said liquid being substantially the sole work-performing medium in said system, pump means in said system adapted to develop and maintain a liquid pressure in said system, means for operating said pump means while the vehicle is stationary, a fluid-operated motor for opening and closing the door of the vehicle, a brake pedal, means operatively connected with said pedal for controlling the liquid pressure in said pressure-operated means, manually operable means for controlling the flow of fluid to said motor and means operable by said motor for preventing a brake-releasing operation of said pressure-operated means when said motor has operated to open the door of the vehicle.

9. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a liquid-circulating pipe system having a liquid therein and including a liquid reservoir, said liquid being substantially the sole work-performing medium in said system, a pump adapted to develop and maintain a liquid pressure in said system, means for operating said pump means while the vehicle is stationary, a pipe line connecting said pump with said pressure-operated means and a return pipe line to said reservoir, manually operable means in said system for controlling the fluid pressure in said pressure-operated means and means including a valve in said system for connecting said pressure-operated means with the return line to said reservoir upon the opening of said door.

10. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a pipe system having a liquid therein and being operatively connected with said pressure-operated means, said liquid being substantially the sole work-performing medium in said system, pump means in said system adapted to develop and maintain a liquid pressure in said system, means for operating said pump means while the vehicle is stationary, means for controlling the liquid pressure in said pressure-operated means, and electrically operable means and electrical control means therefor for reducing the liquid pressure in said pressure-operated means when the door of said vehicle is opened whereby to prevent a brake-releasing operation of said brake mechanism.

11. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a pipe system having a liquid therein and being operatively connected with said pressure-operated means, said liquid being substantially the sole work-performing medium in said system, pump means in said system adapted to develop and maintain a liquid pressure in said system, means for operating said pump means while the vehicle is stationary, means for controlling the liquid pressure in said pressure-operated means, means for operating the door of said vehicle, manually operable means for controlling the operation of said door-operating means, electrically operable means and an electrical control means therefor operatively associated with said door-operating means for reducing the liquid-pressure in said pressure-operated means when the door of said vehicle is opened whereby to prevent a brake-releasing operation of said brake mechanism.

12. In a hydraulic, control system for a vehicle comprising a door, and brake mechanism for the vehicle wheels, pressure-operated means operatively connected to the brake mechanism of said vehicle and arranged to release the brakes when liquid under pressure is admitted thereto, mechanical means for applying the brakes when the liquid pressure so admitted to said pressure-operated means is reduced, a liquid-circulating, pipe system having a liquid therein and including a liquid reservoir, said liquid being substantially the sole work-performing medium in said system, a pump adapted to develop and maintain a liquid pressure in said system, means for operating said pump means while the vehicle is stationary, a pipe line connecting said pump with said pressure-operated means and a return pipe line to said reservoir, and manually operable means in said system for controlling the fluid pressure in said pressure-operated means.

LOUIS C. HYATT.
ERNEST HEYMAN.